United States Patent

Hilbert

[11] 4,121,277
[45] Oct. 17, 1978

[54] HIGH CURRENT PROTECTION IN A SOLID ELECTROLYTIC CAPACITOR

[75] Inventor: Ferdinand Hilbert, Heidenheim, Germany

[73] Assignee: Siemens Aktiengesellschaft, Berlin and Munich, Germany

[21] Appl. No.: 700,533

[22] Filed: Jun. 28, 1976

[30] Foreign Application Priority Data

Jul. 14, 1975 [DE] Fed. Rep. of Germany ....... 2531438

[51] Int. Cl.² .............................................. H01G 9/00
[52] U.S. Cl. ................................... 361/433; 337/290; 361/275
[58] Field of Search ............ 317/230, 247, 256, 12 R; 29/570; 337/290, 292; 361/433, 272, 275, 278, 306, 308

[56] References Cited

U.S. PATENT DOCUMENTS

| | | | |
|---|---|---|---|
| 3,236,976 | 2/1966 | Rayno | 337/292 |
| 3,638,083 | 1/1972 | Dornfeld et al. | 317/247 |
| 3,935,516 | 1/1976 | Petrikat | 317/230 |
| 3,971,970 | 7/1976 | Voyles et al. | 317/230 |

*Primary Examiner*—Stanley D. Miller, Jr.
*Assistant Examiner*—James W. Davie
*Attorney, Agent, or Firm*—Hill, Gross, Simpson, Van Santen, Steadman, Chiara & Simpson

[57] ABSTRACT

When solid electrolytic capacitors are connected with incorrect polarities to a current source, short circuit currents flow. The capacitors may heat up to such an extent that the capacitor internal portions ignite and the casings of the capacitors, such as plastic casings, begin to burn. By providing a gap between a cathode terminal and a cathode contacting within the capacitor whereby the gap is bridged with a meltable circuit breaker such as solder, burning of the capacitor may be prevented. When internal portions of the capacitor heat due to incorrect polarity connections, the solder will melt and the current will be interrupted.

8 Claims, 1 Drawing Figure

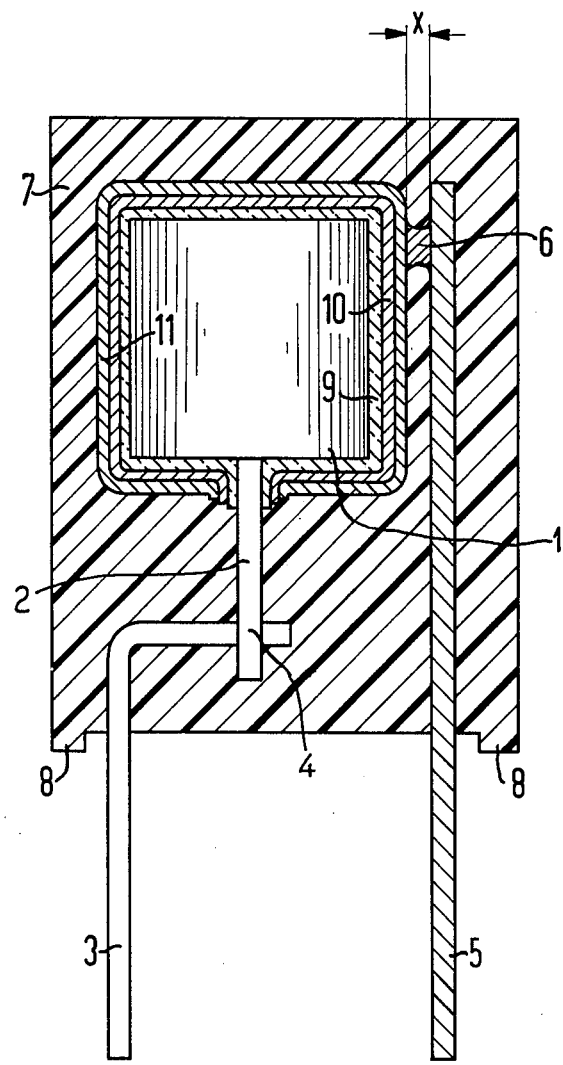

HIGH CURRENT PROTECTION IN A SOLID ELECTROLYTIC CAPACITOR

BACKGROUND OF THE INVENTION

1. Field of the Invention

This invention relates to solid electrolytic capacitors and more particularly to solid electrolytic capacitors having an anode constructed of a valve metal, an oxide layer positioned thereupon and serving as a dielectric, a semiconductive electrolyte as a cathode, a cathode contacting member, and terminals for the anode and cathode.

2. Description of the Prior Art

Solid electrolytic capacitors are known in the prior art wherein tantalum is used as a valve material as processed to become a center anode. By a forming process, an oxide layer functioning as a dielectric is produced upon the anode. Semiconductor manganese dioxide is principally used as a cathode. A contact means is applied on the manganese dioxide layer generally consisting of a graphite layer and a silver layer thereupon. The silver layer is connected to the cathode terminal by use of solder. In order to obtain a strong solder connection between the terminal element and the silver layer, a contact is established between the two parts prior to soldering.

The above described capacitors do not have a current limiting value when they are connected with incorrect polarity across low-ohmic voltage sources when voltage breakthrough occurs. The very high short-circuit current which may occur will heat the capacitor member to such an extent that central portions of the capacitor used as the anode begin to ignite. In the case of capacitors having a plastic casing, the casing may start to burn. If such capacitors are arranged on conductor plates, adjacent components may also be destroyed by the intense heat. Furthermore, the danger exists that the entire conductor plate or printed circuit board may begin to burn and the device becomes destroyed.

SUMMARY OF THE INVENTION

It is an object of this invention to provide a solid electrolytic capacitor whereby the previously mentioned drawbacks due to incorrect polarization are avoided.

With the device of this invention, the problems of the prior art are solved by providing a gap between the cathode terminal and the cathode contacting member wherein the gap is bridged by a meltable circuit breaker such as a metallic fuse.

A solder material with a melting point of less than 200° C. is preferably selected as the fuse such that the diameter of the fuse approximately corresponds to the spacing of the cathode terminal from the cathode contacting member. With the capacitor of this invention, when high short circuit load currents occur, central portions of the capacitor together with the fuse heat up. The metallic fuse becomes liquid and due to the spacing between the cathode terminal and cathode contacting member, an interruption occurs. In case of damage, the capacitor thus cannot heat up in response to short circuit currents and no burning or damage to remaining components occurs.

BRIEF DESCRIPTION OF THE DRAWING

The drawing illustrates a side cross-sectional view of the capacitor in accordance with this invention.

DESCRIPTION OF THE PREFERRED EMBODIMENTS

A central anode 1 made of valve metal such as tantalum is connected with an anode terminal 2 which also consists of tantalum. An outer anode terminal element 3 consisting of a tin coated nickel wire is welded against anode terminal 2 at position 4. The semiconductor electrolyte 10 consisting, for example, of manganese dioxide, functions as a cathode and is positioned in known manner upon the center anode 1 with an oxide layer 9 as a dielectric therebetween.

The cathode contacting member or layer 11 is positioned upon the electrolyte and may consist of a graphite layer and a metal layer thereupon. The metal layer may be copper or a conductive silver-lacquer layer, for instance. A tin coated nickel wire serves as a cathode terminal 5. A spacing "x" is present between the cathode terminal 5 and the capacitor member 1. This spacing is bridged by the fuse or circuit breaker 6. The spacing "x" is related to the diameter of the central member 1, and amounts preferably to 0.5 mm in the case of a central anode 1 having a diameter of 4.5 mm, for example. The material chosen for the metallic fuse 6 is selected such that the casing 7, consisting of a thermosetting material, will not begin to burn. Preferably, a metal solder having a melting point of less than 200° C. is used, such as $Sn_{60}PbAg$, which has a melting point between 180° and 190° C.

When the capacitor is not provided with a casing, the melting point of the metallic fuse 6 must be selected such that the capacitor member 1 does not begin to ignite.

In the case of the preferred embodiment as shown in the drawing, spacing feet 8 are positioned at the lower end of the casing.

In order to illustrate the advantages of the capacitors in accordance with this invention, solid tantalum electrolyte capacitors having a circuit breaker in accordance with this invention and a thermosetting casing were subjected to self-destruction testing. The capacitors were connected to a voltage with incorrect polarity and loaded with a short circuit current of approximately 10A. In the case of all capacitors of this invention, an interruption of the short circuit current occurred within two minutes. In comparison, prior art capacitors without a circuit breaker in accordance with the teachings of this invention were subjected to the same test and, in the case of 80% of these capacitors, either the plastic casing burned or the central member of the capacitor was ignited. With 20% of these prior art capacitors, either an interruption of the current occurred within two minutes or the short circuit remained.

As can be observed from this testing no problems occur when the capacitors of this invention are used since even when the capacitors are connected with incorrect polarity or with excessive current loads, the capacitors are not ignited whereas 80% of the prior art capacitors incurred heavy damage.

Although various modifications may be suggested by those versed in the art, it should be understood that I wish to embody within the scope of the patent warranted hereon, all such embodiments as reasonably and properly come within the scope of my contribution of the art.

I claim as my invention:

1. A solid electrolytic capacitor comprising:
   (a) an anode;

(b) an oxide layer on said anode as a dielectric;
(c) a semiconductive electrolyte on said oxide layer as a cathode;
(d) a cathode contacting layer on said electrolyte;
(e) an anode terminal connected to said anode;
(f) a cathode terminal;
(g) a plastic case with said anode, said cathode, and said cathode contacting layer mounted therein as a central member, said cathode terminal being spaced from said central member to form a spacing therebetween;
(h) a meltable circuit breaker bridged between said cathode terminal and said cathode contacting layer in said spacing; and
(i) a diameter of said meltable circuit breaker approximately corresponding to said spacing bridged by said circuit breaker between said cathode terminal and said cathode contacting layer.

2. A solid electrolytic capacitor in accordance with claim 1, characterized in that said anode comprises tantalum.

3. A solid electrolytic capacitor in accordance with claim 1 characterized in that said semiconductive electrolyte is manganese dioxide.

4. A solid electrolytic capacitor in accordance with claim 1 characterized in that said cathode contacting layer comprises a graphite layer and a conductive silver-lacquer layer.

5. A solid electrolytic capacitor in accordance with claim 1 characterized in that said meltable circuit breaker consists of a solder metal with a melting point of less than 200° C.

6. A solid electrolytic capacitor in accordance with claim 1 characterized in that said anode has a diameter of 4.5 mm and said distance bridged by said meltable circuit breaker is 0.5 mm.

7. A solid electrolytic capacitor of claim 1 in which said circuit breaker comprises silver-lead solder with approximately 60% tin.

8. A solid electrolytic capacitor comprising:
(a) an anode;
(b) a cathode comprising a semiconductive electrolyte and a cathode contacting layer;
(c) a dielectric between said anode and said cathode;
(d) an anode terminal connected to said anode;
(e) a cathode terminal;
(f) a plastic case with said anode and said cathode mounted therein as a central member, said cathode terminal being spaced alongside of an edge of said central member to form a spacing therebetween; and
(g) a meltable circuit breaker bridged between said cathode terminal and said cathode within a portion of said spacing, a diameter of said meltable circuit breaker approximately corresponding to the spacing bridged by the circuit breaker between said cathode terminal and said cathode.

* * * * *